US009246925B2

(12) United States Patent
Zhang (10) Patent No.: US 9,246,925 B2
(45) Date of Patent: Jan. 26, 2016

(54) METHOD AND SYSTEM FOR THIRD-PARTY SERVICE PLATFORM LOGIN (71) Applicant: TENCENT TECHNOLOGY (SHENZHEN) COMPANY LIMITED, Shenzhen (CN)

(72) Inventor: Xiaolong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 40 days.

(21) Appl. No.: 14/135,611

(22) Filed: Dec. 20, 2013

(65) Prior Publication Data

US 2014/0310778 A1    Oct. 16, 2014

Related U.S. Application Data

(63) Continuation of application No. PCT/CN2013/075079, filed on May 2, 2013.

(30) Foreign Application Priority Data

Apr. 16, 2013   (CN) .......................... 2013 1 0132865

(51) Int. Cl.
*G06F 21/00*    (2013.01)
*H04L 9/32*    (2006.01)
*G06F 7/04*    (2006.01)
*H04L 29/06*    (2006.01)
*G06F 21/31*    (2013.01)

(52) U.S. Cl.
CPC ............. *H04L 63/102* (2013.01); *G06F 21/31* (2013.01); *H04L 63/08* (2013.01); *H04L 63/083* (2013.01)

(58) Field of Classification Search
CPC ........ H04L 63/08; H04L 63/083; G06F 21/31
USPC .................... 726/4, 5; 713/168, 182
See application file for complete search history.

(56) References Cited

U.S. PATENT DOCUMENTS

| 2008/0062992 | A1* | 3/2008 | Sawada et al. ................. 370/392 |
| 2009/0265552 | A1* | 10/2009 | Moshir et al. ................. 713/168 |
| 2014/0082350 | A1* | 3/2014 | Zarfoss et al. ................. 713/155 |
| 2014/0096205 | A1* | 4/2014 | Zhuang et al. .................... 726/4 |

FOREIGN PATENT DOCUMENTS

| CN | 1839608 A | 9/2006 |
| CN | 1855843 A | 11/2006 |
| CN | 101877637 A | 11/2010 |
| CN | 102413466 A | 4/2012 |
| CN | 102571857 A | 7/2012 |

OTHER PUBLICATIONS

The World Intellectual Property Organization (WIPO) International Search Report for PCT/CN2013/075079 Jan. 23, 2014.

* cited by examiner

*Primary Examiner* — Aravind Moorthy
(74) *Attorney, Agent, or Firm* — Anova Law Group, PLLC (57) ABSTRACT

A third-party service platform login method is provided for a public platform containing information of a plurality of third-party service platforms. The method includes accepting a user logging onto the public platform from a client terminal, obtaining a third-party service platform selected by the user on the public platform, and obtaining a user identification number (UIN) of the user and a UIN of the selected third-party service platform. The user's UIN corresponds to a user account of the user on the public platform and the selected third-party service platform's UIN corresponds to a public account of the third-party service platform on the public platform. Further, the method includes combining the UIN of the user and the UIN of the selected third-party service platform to generate a new combined user account for the user to log onto the selected third-party service platform, and logging onto the selected third-party service platform.

20 Claims, 7 Drawing Sheets

METHOD AND SYSTEM FOR THIRD-PARTY SERVICE PLATFORM LOGIN

CROSS-REFERENCES TO RELATED APPLICATIONS

The application is a continuation application of PCT Patent Application No. PCT/CN2013/075079, filed on May 2, 2013, which claims priority of Chinese Patent Application No. 201310132865.9, filed on Apr. 16, 2013, the entire contents of which are hereby incorporated by reference.

FIELD OF THE INVENTION

The present invention generally relates to Internet security technologies and, more particularly, to methods and systems for logging onto third-party service platforms.

BACKGROUND

With the development of Internet technologies, more and more people are accustomed to learning all types of things through the Internet. Various service providers often require a user to register personal information individually with a corresponding service platform first, and the user logs onto the service platform directly or through an account of a registered public platform, after which the user can enjoy more services provided by the service platform. Regardless of the manner to log onto the service platform, however, there are security risks concerning the user's personal information being leaked to others.

Especially, with the development of public platforms, more and more third-party service platforms provide services using the public platform as the bases. A user registered with a public platform can use the registered account to log onto different third-party service platforms, and the third-party service platforms all display such registered account information. For example, the user's instant messaging (IM) account can be authorized to log onto different third-party service platforms, the user can use the same IM account to log onto individual third-party service platforms and those third-party service platforms all displayed the user's IM account information to the developers of third-party service platforms. This may make it easy to leak personal information of the user, and the security of the user's personal information cannot be guaranteed.

The disclosed methods and systems are directed to solve one or more problems set forth above and other problems.

BRIEF SUMMARY OF THE DISCLOSURE

One aspect of the present disclosure includes a third-party service platform login method for a public platform containing information of a plurality of third-party service platforms. The method includes accepting a user logging onto the public platform from a client terminal and obtaining a third-party service platform selected by the user on the public platform. The method also includes obtaining a user identification number (UIN) of the user and a UIN of the selected third-party service platform, wherein the user's UIN corresponds to a user account of the user on the public platform and the selected third-party service platform's UIN corresponds to a public account of the third-party service platform on the public platform. Further, the method includes combining the UIN of the user and the UIN of the selected third-party service platform to generate a new combined user account for the user to log onto the selected third-party service platform, and logging onto the selected third-party service platform.

Another aspect of the present disclosure includes a third-party service platform login system having a public platform containing information of a plurality of third-party service platforms. The system includes a login module, a selection module, an acquisition module, a combination module, and a relay module. The login module is configured to accept a user logging onto the public platform from a client terminal; the selection module is configured to select a third-party service platform on the public platform; and the acquisition module is configured to obtain a user identification number (UIN) of the user and a UIN of the selected third-party service platform. The user's UIN corresponds to a user account of the user on the public platform and the selected third-party service platform's UIN corresponds to a public account of the third-party service platform on the public platform. Further, the combination module is configured to combine the UIN of the user and the UIN of the selected third-party service platform to generate a new combined user account for the user to log onto the selected third-party service platform; and the relay module is configured to log onto the selected third-party service platform using the combined user account.

Another aspect of the present disclosure includes a third-party service platform login method for a client terminal. The method includes logging onto a public platform containing information of a plurality of third-party service platforms by a user on the client terminal and, based on the information of the plurality of third-party service platforms displayed on an interface of the public platform, selecting a third-party service platform by the user on the public platform. The method further includes accessing the selected third-party service platform automatically logged in for the user by the public platform using a combined user account obtained based on a user identification number (UIN) of the user and a UIN of the selected third-party service platform. The user's UIN corresponds to a user account of the user on the public platform and the selected third-party service platform's UIN corresponds to a public account of the third-party service platform on the public platform. The method also includes, based on information of the combined user account, sending an authorization for the selected third-party service platform to obtain registration information of the user.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings.

Figure 9:
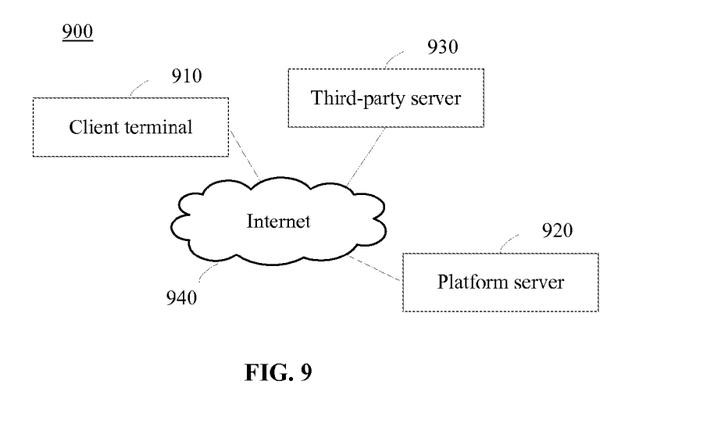
FIG. 9 illustrates an exemplary third-party service platform login environment incorporating certain disclosed embodiments.

FIG. 9 illustrates an exemplary third-party service platform login environment incorporating certain disclosed embodiments. As shown in FIG. 9, environment 900 may include a client terminal 910, a platform server 920, a third-party server 930, and the Internet 940, etc. The client terminal 910, the platform server 920, and the third-party server 930 may be coupled through the Internet 940 for information exchange, such as IM (instant message) communication, web log (blog) communication, etc. Although only one client terminal 910, one platform server 920, and one third-party server 930 are shown in the environment 900, any number of client terminal 910, platform server 920, and/or third-party server 930 may be included, and other devices may also be included.

Further, the Internet 940 may include any appropriate communication network for providing network connections to the client terminal 910, the platform server 920, and the third-party server 930, either wired or wireless.

A client terminal, as used herein, may refer to any appropriate user terminal with certain computing capabilities, such as a smart phone, a personal computer (PC), a work station computer, a server computer, a hand-held computing device (tablet), a mobile phone, or any other user-side computing device. A client terminal may run certain client software programs to implement certain functionalities, such as social networking client-side functions, short message client-side functions, etc. Such client-side software programs may be referred as a client-side or simply a client. One or more copies of a client-side software program may be run simultaneously on a client terminal. Further, the client may be started by the client terminal automatically or by a user of the client terminal. That is, a user may be associated with the client terminal or with a client or clients. Unless explicitly described, the client terminal, the client, and the user may together or individually refer to a collection of the client terminal/client/user (e.g., client terminal 910, client 910, or user 910).

A platform server, as used herein, may refer one or more server computers configured to provide certain public platform server functionalities, such as social networking platforms, web blog platforms, we-chat (i.e., micro letter) platforms, etc. A platform server may also include one or more processors to execute computer programs in parallel.

A third-party server, as used herein, may refer one or more server computers configured to provide certain service platform server functionalities, such as weather services, shopping services, online concierge services, etc. A third-party server may also include or more processors to execute computer programs in parallel.

Figure 10:
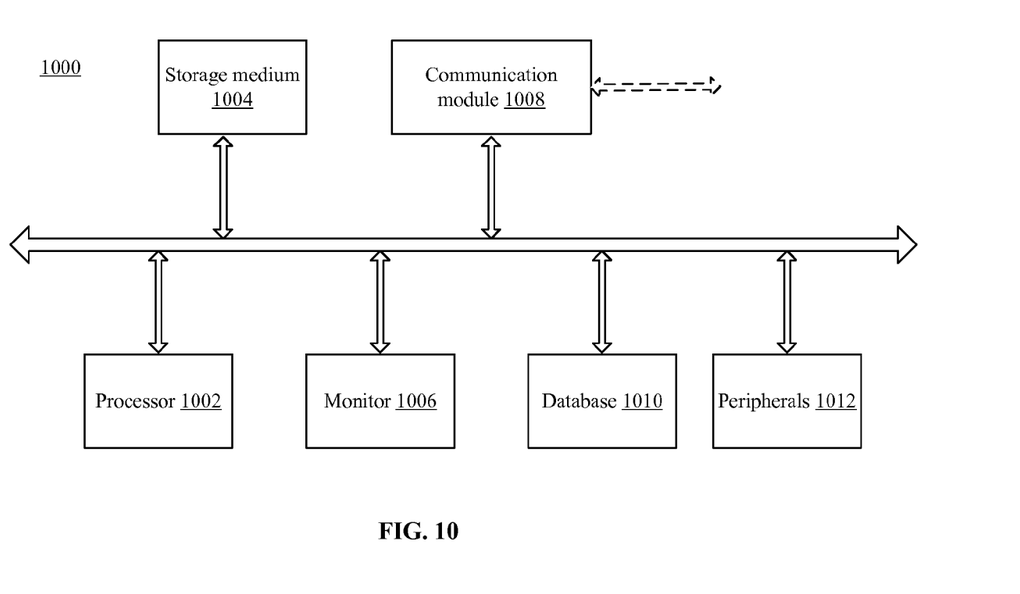
FIG. 10 illustrates a block diagram of an exemplary computer system consistent with the disclosed embodiments.

The client terminal 910, the platform server 920, and/or the third-party server 930 may be implemented on any appropriate computing platform. FIG. 10 shows a block diagram of an exemplary computer system 1000 capable of implementing client terminal 910, platform server 920, and/or third-party server 930.

As shown in FIG. 10, computer system 1000 may include a processor 1002, a storage medium 1004, a monitor 1006, a communication module 1008, a database 1010, and peripherals 1012. Certain devices may be omitted and other devices may be included.

Processor 1002 may include any appropriate processor or processors. Further, processor 1002 can include multiple cores for multi-thread or parallel processing. Storage medium 1004 may include memory modules, such as ROM, RAM, flash memory modules, and erasable and rewritable memory, and mass storages, such as CD-ROM, U-disk, and hard disk, etc. Storage medium 1004 may store computer programs for implementing various processes, when executed by processor 1002.

Further, peripherals 1012 may include I/O devices such as keyboard and mouse, and communication module 1008 may include network devices for establishing connections through the communication network. Database 1010 may include one or more databases for storing certain data and for performing certain operations on the stored data, such as database searching.

In operation, client terminal 910, platform server 920, and/or third-party server 930 may perform certain methods for the third-party server 930 to provide services to client terminal 910. More particularly, a user of client terminal 910 may log onto a third-party service platform of the third-party server 930 by logging onto a public platform (e.g., an IM platform, a we-chat platform, etc.) of the platform server 920, without the risk of leaking the user's personal information.

Figure 1:
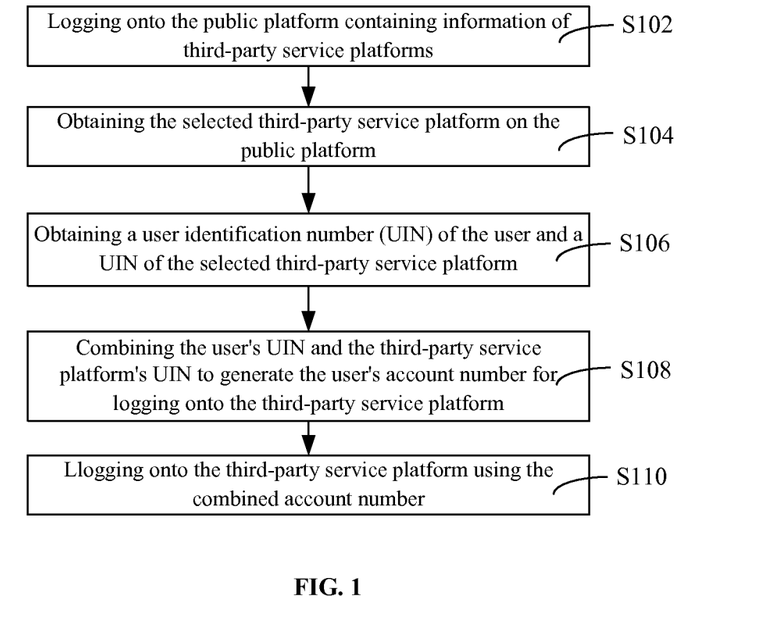
FIG. 1 is a flowchart of an exemplary third-party service platform login method consistent with the disclosed embodiments.

FIG. 1 illustrates a flowchart of an exemplary third-party service platform login method consistent with the disclosed embodiments. The third-party service platform login method may be implemented on client terminal 910, platform server 920, and/or third-party server 930. As shown in FIG. 1, the third-party service platform login method includes the following steps:

Step 102, logging onto the public platform containing information of third-party service platforms. That is, the public platform provides an interface for the user to log onto the public platform and accepts the user logging onto the public platform.

First, the user needs to register with the public platform to obtain a corresponding user account. A third-party service platform also needs to be registered with the public platform to obtain a corresponding public account. Using client terminal 910, the user may then log onto the platform server 920 of the public platform using the registered user account number. For example, for a we-chat public platform, the user registers with the we-chat public platform to obtain the corresponding we-chat user account, such as 'A0001'. Also, a third-party service platform registers with the we-chat public platform to obtain the corresponding we-chat public account, such as 'weather-service B0001'.

The public platform may display information about a plurality of third-party service platforms, such as weather service platform information, travel service platform information, shopping service platform information, etc. The third-party service platform information may include link addresses and brief introductions, etc., of the third-party service platforms, and may be in the form of text information, image information, or combined text and image information, etc.

Figure 2:
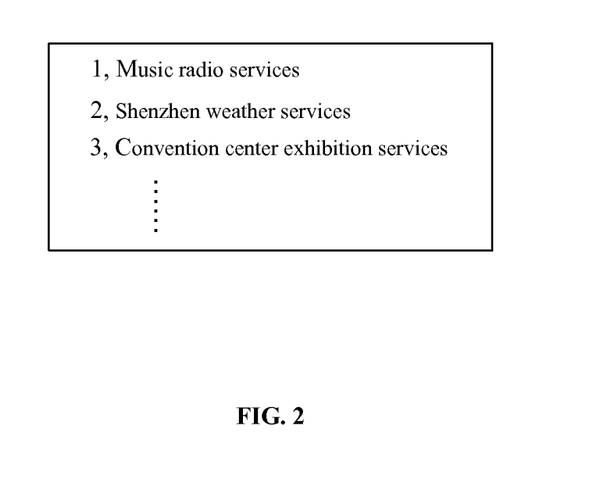
FIG. 2 illustrates exemplary third-party service platform information displayed on a public platform in a list format consistent with the disclosed embodiments.
Figure 3:
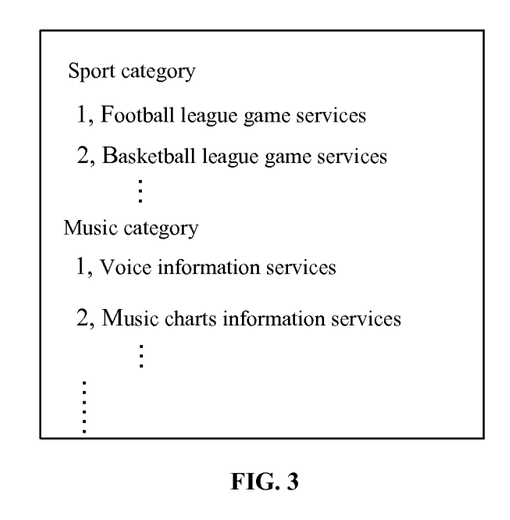
FIG. 3 illustrates exemplary third-party service platform information displayed on a public platform in a category format consistent with the disclosed embodiments.

The various third-party service platform information may be displayed in a list format or a category format, as illustrated in FIG. 2 and FIG. 3, respectively. As shown in FIG. 2, a plurality of third-party service platforms are listed: music radio services, Shenzhen weather services, convention center exhibition services, etc. Further, when the third-party service platform information is displayed in a list format, statistics of the third-party service platforms may be collected, such as visiting volume, etc., and the third-party service platforms may be sorted based on the collected statistics, with the third-party service platforms having higher visiting volume displayed at the front of the list. The third-party service platforms can also be scored according to predetermined criteria and the order of display may be set based on the scores of the third-party service platforms. Other methods may also be used.

As shown in FIG. 3, a plurality of third-party service platforms are displayed in the category format, such as a sport category: football league game services, basketball league game services, etc.; a music category: Voice information services, music charts information services, etc.

Step S104, obtaining the selected third-party service platform on the public platform. Specifically, after the information of the plurality of third-party service platforms is displayed in a list format on an interface of the public platform, the user can select a third-party service platform for accessing by pressing a button or touching a screen on the client terminal.

Step S106, obtaining a user identification number (UIN) of the user and a UIN of the selected third-party service platform.

The UIN of the user corresponds to the user account of the user, and the UIN of the third-party service platform corresponds to the public account of the third-party service platform. The user account of the user and the public account of the third-party service platform were previously registered with the public platform.

More specifically, when the user registers with the public platform, the user obtains the user account, and the public platform assigns the user account a unique user identification number (UIN number), which uniquely identifies the user account. When the third-party service platform registers with the public platform, the third-party service platform obtains the public account, and the public platform assigns the public account a unique identification number (UIN number), which uniquely identifies the public account. The public platform (e.g., the server of the public platform) stores a mapping relationship between the user's user account and the user's UIN, and a mapping relationship between the third-party service platform's public account and the third-party service platform's UIN.

To retrieve the UIN, the public platform (e.g., platform server 920) may search and obtain the user's UIN based on the user's user account and the mapping relationship between the user account and the user's UIN. Similarly, the public platform (e.g., platform server 920) may search and obtain the third-party service platform's UIN based on the third-party service platform's public account and the mapping relationship between the public account and the third-party service platform's UIN.

Step S108, combining the user's UIN and the third-party service platform's UIN to generate the user's account number for logging onto the third-party service platform.

Specifically, the user's UIN and the third-party service platform's UIN may be encrypted or superimposed to form the user's account number for logging onto the third-party service platform. Encryption can be performed by using MD5, DES (Data Encryption Standard, a symmetric algorithm), 3DES, RC2 and RC4, and IDEA (International Encryption Algorithm, International Data Encryption Algorithm), etc. The superimposition may be performed by appending the third-party service platform's UIN, such as 'UI0001', to the user's UIN, such as 'U0001' to generate a user account number, such as 'U0001UI0001'. The user may receive the combined user account from the public platform or by the display of the public platform and/or the third-party service platform.

Step S110, logging onto the third-party service platform using the combined account number.

Specifically, the user may first log onto the public platform using the user's user account, and the public platform uses the combined account number to log onto the selected third-party service platform. Thus, the user information on the third-party service platform to be displayed to developers of the third-party service platform is the combined account number, not the user's user account. Alternatively, the user may also log onto the third-party service platform using the combined user account.

Thus, using this third-party service platform login method, the user first logs onto the public platform through the user's user account on the public platform, while the public platform uses the user's UIN and the UIN of the selected third-party service platform to generate a combined user account for logging onto the third-party service platform. The combined user account is then used to log onto the third-party service platform, such that the third-party service platform only displays the combined user account and not the user's user account. Thus, it may be difficult for the user's user account information to be leaked out, ensuring the security of the user's user account. Further, because different third-party service platforms have different UINs, the combined user accounts on these different third-party service platforms are also different. Thus, the risk of leaking the user's user account is further reduced.

Figure 4:
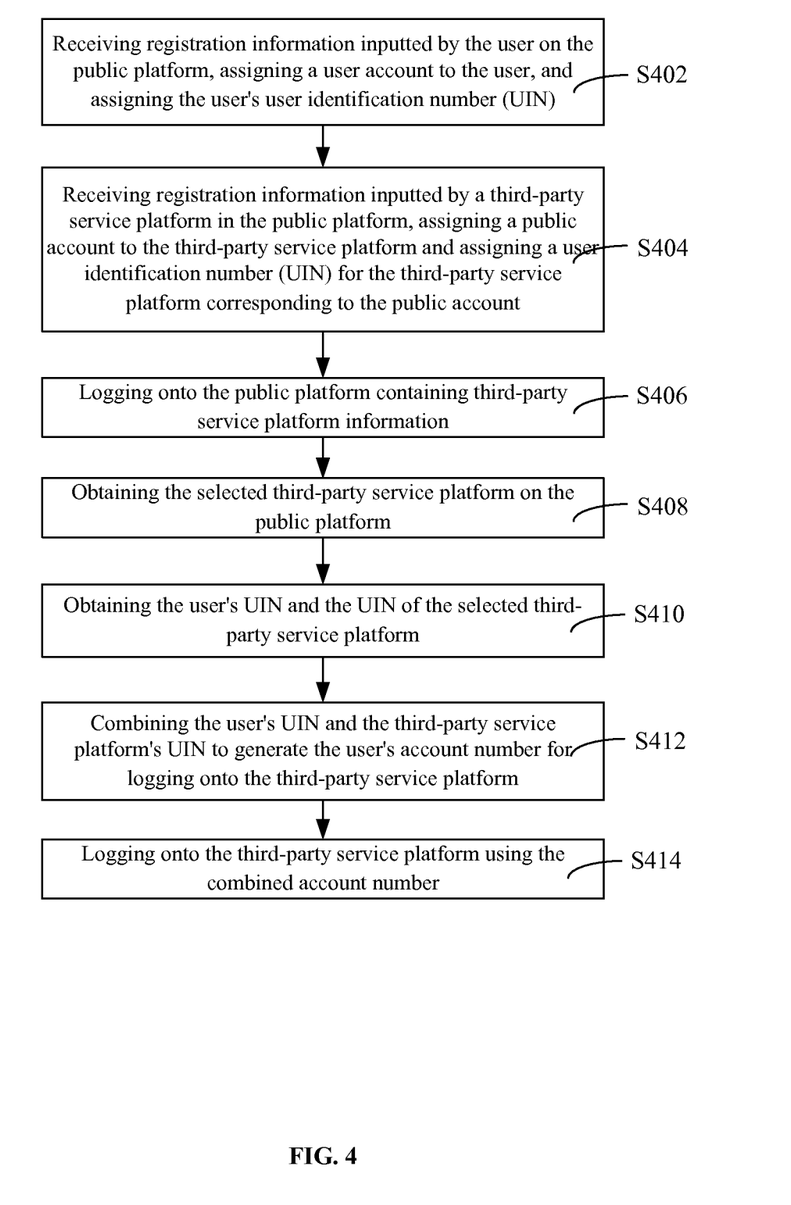
FIG. 4 is a flowchart of another third-party service platform login method consistent with the disclosed embodiments.

FIG. 4 shows a flowchart of another exemplary third-party service platform login method. The method illustrated in FIG. 4 includes more details of a registration process in the public platform. As shown in FIG. 4, the third-party service platform login method includes:

Step S402, receiving registration information inputted by the user on the public platform, assigning a user account to the user, and assigning the user's user identification number (UN).

Specifically, the user may interact with the public platform (e.g., platform server 920) through a client-side on a mobile phone, a personal computer, or a handheld computer (e.g., client terminal 910). The user may input the registration information by pressing a key or touching a screen, etc., such that the public platform server can receive the user's registration information. The registration information may include at least one of user name, user's real name, address, place of birth, identity card number, occupation, and contact phone, etc. After the user successfully registers with the public platform, the public platform server assigns a user account number to the user, and also assigns the user a unique user identification number (UIN) corresponding to the user account number.

Step S404, receiving registration information inputted by a third-party service platform in the public platform, assigning a public account to the third-party service platform and assigning a user identification number (UIN) for the third-party service platform corresponding to the public account.

Specifically, the registration information entered by the third-party service platform on the public platform may include the name, link address, type of service provided, service content, and service contact, etc., of the third-party service platform. After the third-party service platform successfully registers with the public platform, the public platform server assigns a unique public account number to the third-party service platform, and also assigns a unique user identification number (UIN) to the third-party service platform corresponding to the public account number.

Step S406, logging onto the public platform containing third-party service platform information.

Specifically, the user first logs onto the public platform using the registered user account. Various information of a plurality of third-party service platforms is displayed on the public platform, such as weather service platforms, travel service platforms, shopping service platforms, etc. For example, the third-party service platform information may include link addresses and brief introductions of the third-party service platforms, and may be in the forms of text information, image information, or combined text and image information. Further, the information of the plurality of third-party service platforms can be displayed in a list format or a category format.

Step S408, obtaining the selected third-party service platform on the public platform.

When the information of the plurality of third-party service platforms is displayed in a list format on a public platform interface, the user can select a third-party service platform for accessing by pressing a button or touching a screen on the client terminal.

Step S410, obtaining the user's UIN and the UIN of the selected third-party service platform.

Specifically, the public platform server may search and obtain the user's UIN based on the user's user account and the mapping relationship between the user account and the user's UIN. Similarly, the public platform (e.g., platform server 920) may search and obtain the third-party service platform's UIN based on the third-party service platform's public account and the mapping relationship between the public account and the third-party service platform's UIN.

Step S412, combining the user's UIN and the third-party service platform's UIN to generate the user's account number for logging onto the third-party service platform. Specifically, the user's UIN and the third-party service platform's UIN may be encrypted or superimposed to form the user's account number for logging onto the third-party service platform.

In step S414, logging onto the third-party service platform using the combined account number.

Figure 5:
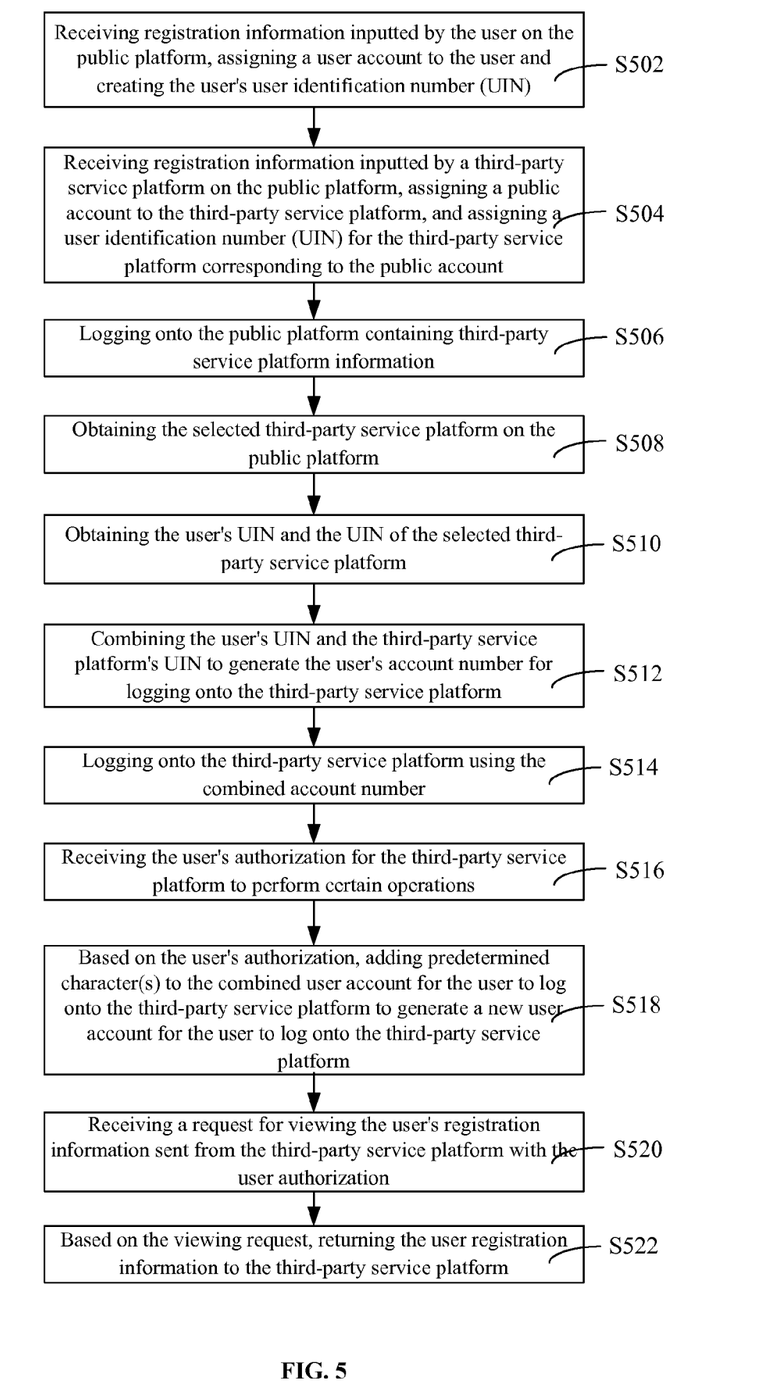
FIG. 5 is a flowchart of another third-party service platform login method consistent with the disclosed embodiments.

FIG. 5 illustrates a flowchart of another third-party service platform login method. The difference between the method illustrated in FIG. 5 and the method illustrated in FIG. 4 may include that the third-party service platform may view the user's registration information after receiving the user's authorization. As shown in FIG. 5, the third-party service platform login method includes:

Step S502, receiving registration information inputted by the user on the public platform, assigning a user account to the user and creating the user's user identification number (UN).

Step S504, receiving registration information inputted by a third-party service platform on the public platform, assigning a public account to the third-party service platform, and assigning a user identification number (UN) for the third-party service platform corresponding to the public account.

Step S506, logging onto the public platform containing third-party service platform information.

The user logs onto the public platform using the registered user account. Various information of a plurality of third-party service platforms is displayed on the public platform, such as weather service platforms, travel service platforms, shopping service platforms, etc. For example, the third-party service platform information may include link addresses and brief introductions of the third-party service platforms, and may be in the forms of text messages, image messages, or combined text and image messages. Further, the information of the plurality of third-party service platforms can be displayed in a list format or a category format.

Step S508, obtaining the selected third-party service platform on the public platform.

When the information of the plurality of third-party service platforms is displayed in a list format on a public platform interface, the user can select a third-party service platform for accessing by pressing a button or touching a screen on the client terminal.

Step S510, obtaining the user's UIN and the UIN of the selected third-party service platform.

Specifically, the public platform server may search and obtain the user's UIN based on the user's user account and the mapping relationship between the user account and the user's UIN. Similarly, the public platform (e.g., platform server 920) may search and obtain the third-party service platform's UIN based on the third-party service platform's public account and the mapping relationship between the public account and the third-party service platform's UN.

Step S512, combining the user's UIN and the third-party service platform's UIN to generate the user's account number for logging onto the third-party service platform. Specifically, the user's UIN and the third-party service platform's UIN may be encrypted or superimposed to form the user's account number for logging onto the third-party service platform.

Step S514, logging onto the third-party service platform using the combined account number.

Step S516, receiving the user's authorization for the third-party service platform to perform certain operations.

Specifically, after the public platform server receives the user's authorization for the third-party service platform, the public platform server may allow the third-party service platform to view the user's registration information.

Step S518, based on the user's authorization, adding predetermined character(s) to the combined user account for the user to log onto the third-party service platform to generate a new user account for the user to log onto the third-party service platform.

Specifically, under normal circumstances, the user account for logging onto the third-party service platform through the public platform does not change. The user account may be modified with the user's authorization. For example, the public platform server may take the original combined user account for logging onto the third-party service platform and add one or more predetermined characters on the original user account to form the new user account for logging onto the third-party service platform. The predetermined characters may include any appropriate self-defined character or character string, such 'SQ' or 'A', indicating user authorization. Afterward, the third-party service platform may display the new user account. The user may receive the new user account information from the public platform or by displaying the new user account on the public platform and/or the third-party service platform.

Step S520, receiving a request for viewing the user's registration information sent from the third-party service platform with the user authorization.

Step S522, based on the viewing request, returning the user registration information to the third-party service platform.

Specifically, after the public platform returns the user's registration information to the third-party service platform, the developers of the third-party service platform can view the user's registration information, such as user name, user account, contact phone number, etc.

Thus, only after the user authorizes the third-party service platform, the authorized third-party service platform can obtain the user's registration information. It may be convenient for the user to authorize a third-party service platform to be provided with the user's registration information, and the safety of the registration information can be controlled, facilitating the of the effective use of the registration information.

Figure 6:
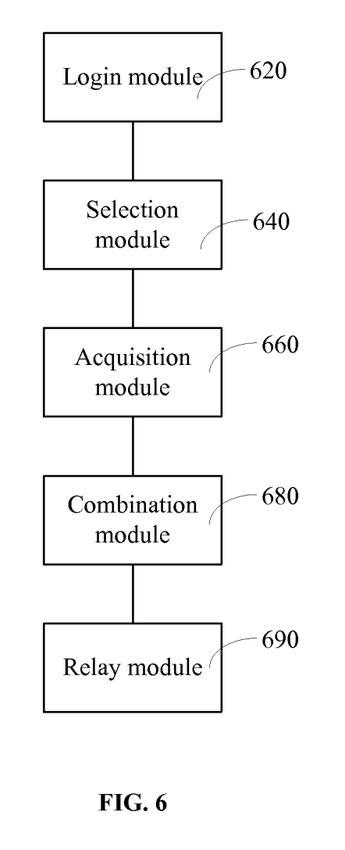
FIG. 6 is a block diagram of an exemplary third-party service platform login system consistent with the disclosed embodiments.

FIG. 6 illustrates a block diagram of an exemplary third-party service platform login system. As shown in FIG. 6, the third-party service platform login system includes a login module 620, a selection module 640, an acquisition module 660, a combination module 680, and a relay module 690. Other modules may also be included.

The login module 620 may be configured to log onto the public platform containing information of third-party service platforms.

First, the user needs to register with the public platform to obtain a corresponding user account. A third-party service platform also needs to be registered with the public platform to obtain a corresponding public account. Using client terminal 910, the user may then log onto the platform server 920 of the public platform using the registered user account number. For example, for a we-chat public platform, the user registers with the we-chat public platform to obtain the corresponding we-chat user account, such as 'A0001'. Also, a third-party service platform registers with the we-chat public platform to obtain the corresponding we-chat public account, such as 'weather-service B0001'.

The public platform may display information about a plurality of third-party service platforms, such as weather service platform information, travel service platform information, shopping service platform information, etc. The third-party service platform information may include link addresses and brief introductions, etc., of the third-party service platforms, and may be in the form of text information, image information, or combined text and image information, etc.

The various third-party service platform information may be displayed in a list format or a category format, respectively. When the third-party service platform information is displayed in a list format, statistics of the third-party service platforms may be collected, such as visiting volume, etc., and the third-party service platforms may be sorted based on the collected statistics, with the third-party service platforms having higher visiting volume displayed at the front of the list. The third-party service platforms can also be scored according to predetermined criteria and the order of display may be set based on the scores of the third-party service platforms.

The selection module 640 may be configured to obtain the selected third-party service platform on the public platform. Specifically, after the information of the plurality of third-party service platforms is displayed in a list format on an interface of the public platform, the user can select a third-party service platform for accessing by pressing a button or touching a screen on the client terminal The acquisition module 660 may be configured to obtain a user identification number (UN) of the user and a UIN of the selected third-party service platform. The UIN of the user corresponds to the user account of the user, and the UIN of the third-party service platform corresponds to the public account of the third-party service platform. The user account of the user and the public account of the third-party service platform were previously registered with the public platform.

More specifically, when the user registers with the public platform, the user obtains the user account, and the public platform assigns the user account a unique user identification number (UIN number), which uniquely identifies the user account. When the third-party service platform registers with the public platform, the third-party service platform obtains the public account, and the public platform assigns the public account a unique identification number (UIN number), which uniquely identifies the public account. The public platform (e.g., the server of the public platform) stores a mapping relationship between the user's user account and the user's UIN, and a mapping relationship between the third-party service platform's public account and the third-party service platform's UIN.

To retrieve the UIN, the public platform (e.g., platform server 920) may search and obtain the user's UIN based on the user's user account and the mapping relationship between the user account and the user's UIN. Similarly, the public platform (e.g., platform server 920) may search and obtain the third-party service platform's UIN based on the third-party service platform's public account and the mapping relationship between the public account and the third-party service platform's UIN.

The combination module 680 may be configured to combine the user's UIN and the third-party service platform's UIN to generate the user's account number for logging onto the third-party service platform.

Specifically, the user's UIN and the third-party service platform's UIN may be encrypted or superimposed to form the user's account number for logging onto the third-party service platform. Encryption can be performed by using MD5, DES (Data Encryption Standard, a symmetric algorithm), 3DES, RC2 and RC4, and IDEA (International Encryption Algorithm, International Data Encryption Algorithm), etc. The superimposition may be performed by appending the third-party service platform's UIN, such as 'UI0001', to the user's UIN, such as 'U0001' to generate a user account number, such as 'U0001UI0001'.

The relay module 690 may be configured to log onto the third-party service platform using the combined account number.

Specifically, the user may first log onto the public platform using the user's user account, and the public platform uses the combined account number to log onto the selected third-party service platform. Thus, the user information on the third-party service platform to be displayed to developers of the third-party service platform is the combined account number, not the user's user account.

Figure 7:
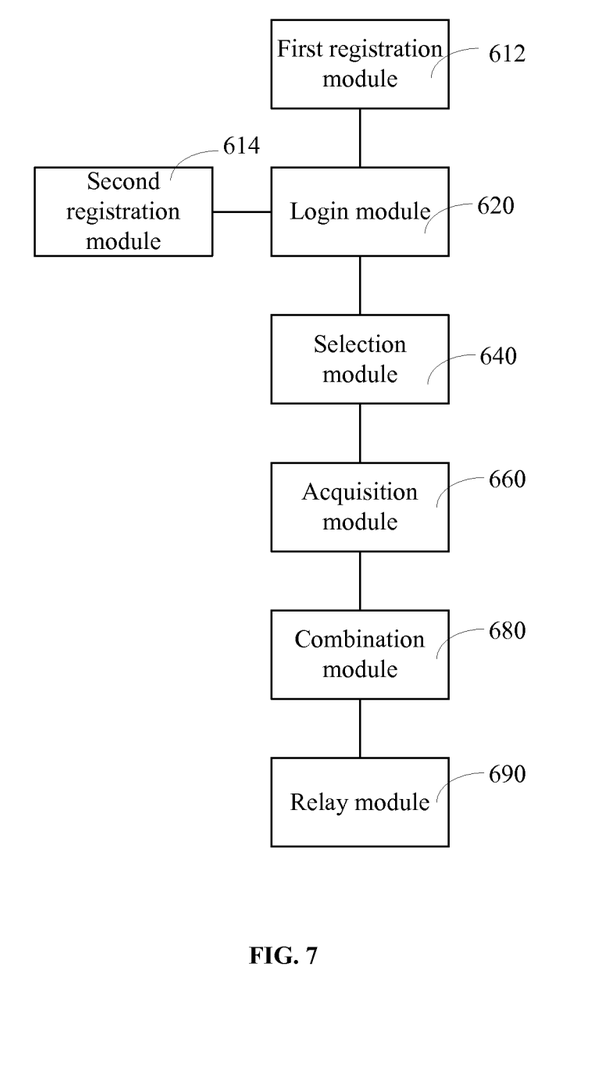
FIG. 7 is a block diagram of another exemplary third-party service platform login system consistent with the disclosed embodiments.

FIG. 7 illustrates a block diagram of another exemplary third-party service platform login system. As shown in FIG. 7, the third-party service platform login system includes login module 620, selection module 640, acquisition module 660, combination module 680, relay module 690, a first registration module 612, and the second registration module 614.

The first registration module 612 may be configured to receive registration information inputted by the user on the public platform, assigning a user account to the user, and assigning the user's user identification number (UIN).

Specifically, the user may interact with the public platform (e.g., platform server 920) through a client-side on a mobile phone, a personal computer, or a handheld computer (e.g., client terminal 910). The user may input the registration information by pressing a key or touching a screen, etc., such that the public platform server can receive the user's registration information. The registration information may include at least one of user name, user's real name, address, place of birth, identity card number, occupation, and contact phone, etc. After the user successfully registers with the public platform, the public platform server assigns a user account number to the user, and also assigns the user a unique user identification number (UIN) corresponding to the user account number.

The second registration module 614 may be configured to receive registration information inputted by a third-party service platform in the public platform, assigning a public account to the third-party service platform and assigning a user identification number (UIN) for the third-party service platform corresponding to the public account.

Specifically, the registration information entered by the third-party service platform on the public platform may include the name, link address, type of service provided, service content, and service contact, etc., of the third-party service platform. After the third-party service platform successfully registers with the public platform, the public platform server assigns a unique public account number to the third-party service platform, and also assigns a unique user identification number (UIN) to the third-party service platform corresponding to the public account number.

Figure 8:
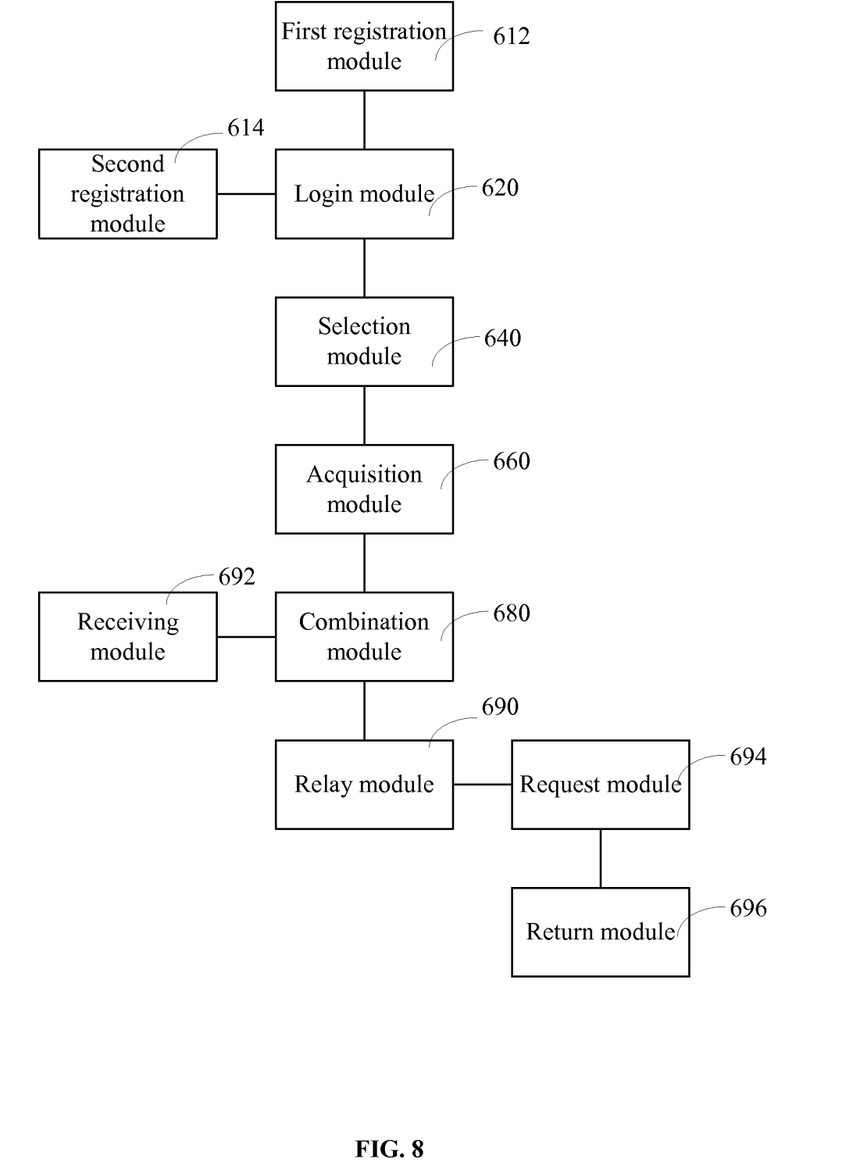
FIG. 8 is a block diagram of another exemplary third-party service platform login system consistent with the disclosed embodiments.

FIG. 8 illustrates a block diagram of another exemplary third-party service platform login system. As shown in FIG. 8, the third-party service platform login system includes first registration module 612, second registration module 614, login module 620, selection module 640, acquisition module 660, combination module 680, relay module 690, a receiving module 692, a request module 694, and a return module 696.

The receiving module 692 may be configured to receive the user's authorization for a third-party service platform to perform certain operations.

Specifically, after the public platform server receives the user's authorization for the third-party service platform, the public platform server may allow the third-party service platform to view the user's registration information.

Further, the combination module 680 may be configured to, based on the user's authorization, add predetermined character(s) to the combined user account for the user to log onto the third-party service platform to generate a new user account for the user to log onto the third-party service platform. Specifically, under normal circumstances, the user account for logging onto the third-party service platform through the public platform does not change. The user account may be modified with the user's authorization. For example, the public platform server may take the original combined user account for logging onto the third-party service platform and add one or more predetermined characters on the original user account to form the new user account for logging onto the third-party service platform. The predetermined characters may include any appropriate self-defined character or character string, such 'SQ' or 'A', indicating user authorization. Afterward, the third-party service platform may display the new account.

The request module 694 may be configured to receive a request for viewing the user's registration information sent from the third-party service platform with the user authorization.

The return module 696 may be configured to, based on the viewing request, return the user registration information to the third-party service platform.

Specifically, after the public platform returns the user's registration information to the third-party service platform, the developers of the third-party service platform can view the user's registration information, such as user name, user account, contact phone number, etc.

The above descriptions merely disclose certain embodiments of the present invention, and are not intended to limit the scope of the present invention. Without departing from the spirit and principles of the present invention, any modifications, equivalent replacements, and improvements, etc., should be included in the protection scope of the present invention. Therefore, the scope of the present disclosure should be defined by the attached claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art.

The disclosed methods, apparatus, and systems can be used in a variety of internet applications, especially in instant messaging (IM), social networking services (SNS), blog services, and we-chat applications. By using the disclosed methods and systems, the user first logs onto the public platform through the user's user account on the public platform, while the public platform uses the user's UIN and the UIN of the selected third-party service platform to generate a combined user account for logging onto the third-party service platform. The combined user account is then used to log onto the third-party service platform, such that the third-party service platform only displays the combined user account and not the user's user account. Thus, it may be difficult for the user's user account information to be leaked out, ensuring the security of the user's user account. Further, because different third-party service platforms have different UINs, the combined user accounts on these different third-party service platforms are also different. Thus, the risk of leaking the user's user account is further reduced.

Further, only after the user authorizes the third-party service platform, the authorized third-party service platform can obtain the user's registration information. It may be convenient for the user to authorize a third-party service platform to be provided with the user's registration information, and the safety of the registration information can be controlled, facilitating the of the effective use of the registration information.

What is claimed is:

1. A third-party service platform login method for a public platform containing information of a plurality of third-party service platforms, comprising:
   accepting a user logging onto the public platform from a client terminal;
   obtaining a third-party service platform selected by the user on the public platform;
   obtaining a user identification number (UIN) of the user and a UIN of the selected third-party service platform, wherein the user's UIN corresponds to a user account of the user on the public platform and the selected third-party service platform's UIN corresponds to a public account of the third-party service platform on the public platform;
   combining, by the public platform, the UIN of the user and the UIN of the selected third-party service platform to generate a new combined user account for the user to log onto the selected third-party service platform; and
   logging onto the selected third-party service platform using the combined user account, wherein the user account of the user on the public platform is not provided to the selected third-party service platform.

2. The third-party service platform login method according to claim 1, wherein combining the UIN of the user and the UIN of the selected third-party service platform further includes:
   performing an encryption operation or a superimposing operation on the UIN of the user and the UIN of the selected third-party service platform to form the new combined user account for the user to log onto the selected third-party service platform.

3. The third-party service platform login method according to claim 1, further including:
  receiving registration information inputted by the user on the public platform;
  assigning the user account and the user's UIN corresponding to the user account to the user;
  receiving registration information inputted by the third-party service platform on the public platform; and
  assigning the third-party service platform's public account and the third-party service platform's UIN corresponding to the public account to the third-party service platform.

4. The third-party service platform login method according to claim 3, further including:
  receiving authorization from the user for the selected third-party service platform; and
  based on the authorization from the user, adding, by the public platform, one or more predetermined characters to the combined user account to generate a new user account for the user to log onto the third-party service platform.

5. The third-party service platform login method according to claim 4, further including:
  receiving a request for viewing registration information of the user from the third-party service platform with authorization of the user; and
  based on the viewing request, returning the registration information of the user to the third-party service platform.

6. The third-party service platform login method according to claim 1, further comprising:
  sorting, by the public platform, the third-party service platforms according to a predetermined criterion; and
  displaying, on the client terminal, information of the sorted third-party service platforms in a list format.

7. The third-party service platform login method according to claim 6, wherein sorting the third-party service platforms according to a predetermined criterion further includes:
  collecting statistics of the third-partying service platforms including visiting volume; and
  sorting the third-partying service platforms according to the visiting volumes.

8. A third-party service platform login system having a public platform containing information of a plurality of third-party service platforms, comprising:
  a login module for accepting a user logging onto the public platform from a client terminal;
  a selection module for selecting a third-party service platform on the public platform;
  an acquisition module for obtaining a user identification number (UIN) of the user and a UIN of the selected third-party service platform, wherein the user's UIN corresponds to a user account of the user on the public platform and the selected third-party service platform's UIN corresponds to a public account of the third-party service platform on the public platform; and
  a combination module for combining the UIN of the user and the UIN of the selected third-party service platform to generate a new combined user account for the user to log onto the selected third-party service platform; and
  a relay module for logging onto the selected third-party service platform using the combined user account, wherein the user account of the user on the public platform is not provided to the selected third-party service platform.

9. The third-party service platform login system according to claim 8, wherein, combining the UIN of the user and the UIN of the selected third-party service platform, further includes:
  performing an encryption operation or a superimposing operation on the UIN of the user and the UIN of the selected third-party service platform to form the new combined user account for the user to log onto the selected third-party service platform.

10. The third-party service platform login system according to claim 8, further including:
  a first registration module for receiving registration information inputted by the user on the public platform, and for assigning the user account and the user's UIN corresponding to the user account to the user; and
  a second registration module for receiving registration information inputted by the third-party service platform on the public platform, and for assigning the third-party service platform's public account and the third-party service platform's UIN corresponding to the public account to the third-party service platform.

11. The third-party service platform login system according to claim 10, further including:
  a receiving module for receiving authorization from the user for the selected third-party service platform,
  wherein the combination module is adds, based on the authorization from the user, one or more predetermined characters to the combined user account to generate a new user account for the user to log onto the third-party service platform.

12. The third-party service platform login system according to claim 11, further including:
  a request module for receiving a request for viewing registration information of the user from the third-party service platform with authorization of the user; and
  a return module for returning, based on the viewing request, the registration information of the user to the third-party service platform.

13. The third-party service platform login system according to claim 8, wherein:
  the third-party service platforms are sorted by the public platform according to a predetermined criterion; and
  information of the sorted third-party service platforms are displayed on the client terminal in a list format.

14. The third-party service platform login system according to claim 13, wherein:
  visiting volumes of the third-partying service platforms are collected; and
  the third-partying service platforms are sorted according to the visiting volumes.

15. A third-party service platform login method for a client terminal, comprising:
  logging onto a public platform containing information of a plurality of third-party service platforms by a user on the client terminal;
  based on the information of the plurality of third-party service platforms displayed on an interface of the public platform, selecting a third-party service platform by the user on the public platform;
  accessing the selected third-party service platform automatically logged in for the user by the public platform using a combined user account created by the public platform based on a user identification number (UIN) of the user and a UIN of the selected third-party service platform, wherein the user's UIN corresponds to a user account of the user on the public platform and the selected third-party service platform's UIN corresponds to a public account of the third-party service platform on the public platform; and based on information of the combined user account, sending an authorization for the selected third-party service platform to obtain registration information of the user;

wherein the user account of the user on the public platform is not provided to the selected third-party service platform.

16. The third-party service platform login method according to claim 15, wherein:

the combined user account is generated by combining the UIN of the user and the UIN of the selected third-party service platform with an encryption operation or a superimposing operation on the UIN of the user and the UIN of the selected third-party service platform.

17. The third-party service platform login method according to claim 15, wherein:

registering with the public platform to be assigned with the user account and the user's UIN corresponding to the user account to the user.

18. The third-party service platform login method according to claim 15, wherein:

receiving a new user account created by the public platform after sending out the authorization, the new user account being generated by adding one or more predetermined characters to the combined user account to generate the new user account for the user to log onto the third-party service platform.

19. The third-party service platform login method according to claim 15, further comprising:

sorting, by the public platform, the third-party service platforms according to a predetermined criterion; and displaying, on the client terminal, information of the sorted third-party service platforms in a list format.

20. The third-party service platform login method according to claim 19, wherein sorting the third-party service platforms according to a predetermined criterion further includes:

collecting statistics of the third-partying service platforms including visiting volume; and sorting the third-partying service platforms according to the visiting volumes.

* * * * *